(12) United States Patent
Ishii (10) Patent No.: US 11,812,133 B2
(45) Date of Patent: Nov. 7, 2023

(54) IMAGE PROCESSING APPARATUS AND METHOD FOR CONTROLLING IMAGE PROCESSING APPARATUS

(71) Applicant: CANON KABUSHIKI KAISHA, Tokyo (JP)

(72) Inventor: Takumi Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/929,632

(22) Filed: Sep. 2, 2022

(65) Prior Publication Data
US 2022/0417423 A1 Dec. 29, 2022

Related U.S. Application Data

(63) Continuation of application No. 17/002,138, filed on Aug. 25, 2020, now Pat. No. 11,438,498.

(30) Foreign Application Priority Data

Aug. 30, 2019 (JP) .................................. 2019-158662

(51) Int. Cl.
*H04N 23/611* (2023.01)
*H04N 23/63* (2023.01)

(52) U.S. Cl.
CPC ......... *H04N 23/611* (2023.01); *H04N 23/632* (2023.01)

(58) Field of Classification Search
CPC .... H04N 23/611; H04N 23/632; H04N 23/62; H04N 23/631; H04N 23/635; H04N 23/673; H04N 23/672; H04N 23/675
See application file for complete search history.

(56) References Cited

U.S. PATENT DOCUMENTS

| 11,438,498 | B2* | 9/2022 | Ishii | H04N 23/631 |
| 2012/0147252 | A1* | 6/2012 | Kunishige | H04N 23/667 348/E5.045 |
| 2014/0104483 | A1* | 4/2014 | Kunishige | H04N 23/635 348/349 |
| 2016/0295100 | A1* | 10/2016 | Yokozeki | H04N 23/635 |
| 2017/0289441 | A1* | 10/2017 | Zhang | G06V 40/165 |
| 2018/0348470 | A1* | 12/2018 | Suzuki | H04N 23/675 |

FOREIGN PATENT DOCUMENTS

| JP | 20010215403 A | 8/2001 |
| JP | 2009037067 A | 2/2009 |
| WO | 2015045911 A1 | 4/2015 |

* cited by examiner

*Primary Examiner* — Kelly L Jerabek
(74) *Attorney, Agent, or Firm* — Canon U.S.A., Inc. IP Division (57) ABSTRACT

An image processing apparatus comprising a first detection unit configured to detect a first area in an image of an image signal output from an image pickup element, a second detection unit configured to detect one or more second areas each corresponding to an eye included in the first area in the image, a specification unit configured to receive an area specification instruction by a user operation and to specify one area in the image, and a setting unit configured to set an object corresponding to the area specified by the specification unit to be focused on, wherein, in a case where the first area is detected by the first detection unit, the specification unit receives specification of the eye in an area based on the first area regardless of a detection result of the second areas.

26 Claims, 6 Drawing Sheets

IMAGE PROCESSING APPARATUS AND METHOD FOR CONTROLLING IMAGE PROCESSING APPARATUS

CROSS REFERENCE OF RELATED APPLICATIONS

This application is a Continuation of U.S. patent application Ser. No. 17/002,138, filed on Aug. 25, 2020, which claims the benefit of Japanese Patent Application No. 2019-158662, filed Aug. 30, 2019, all of which are hereby incorporated by reference herein in their entirety.

BACKGROUND

Field of the Disclosure

The present disclosure relates to an imaging apparatus capable of automatically focusing on an eye.

Description of the Related Art

There is known a technique used in a digital camera including an image pickup element for detecting a face of a person from image data obtained by the image pickup element and focusing on an eye in a case where the eye is detected from an area corresponding to the face in the image data.

Japanese Patent Application Laid-Open No. 2015-96961 discusses a technique for focusing on a specified eye in a case of a mode in which a user specifies either a left eye or a right eye to focus on.

According to the technique discussed in Japanese Patent Application Laid-Open No. 2015-96961, the user can focus on an indented eye of the left and right eyes. However, the technique according to Japanese Patent Application Laid-Open No. 2015-96961 has an issue in terms of usability. For example, the user can specify either of the left and right eyes only in a case where the eye the user intends to specify is detected. Thus, the user needs to wait until the eye the user intends to specify is detected. Further, for example, focus is set on the same eye of the left and right eyes regardless of who an object is.

SUMMARY

The present disclosure is directed to a technique for allowing a user to specify an intended eye of an intended object regardless of whether the eye of the object on which the user intends to focus is detected, in comparison with a conventional technique.

According to an aspect of the present invention, an image processing apparatus includes one or more processors, and a memory storing instructions which, while being executed by the one or more processors, cause the image processing apparatus to function as units includes a first detection unit configured to detect a first area in an image of an image signal output from an image pickup element, a second detection unit configured to detect one or more second areas each corresponding to an eye included in the first area in the image, a specification unit configured to receive an area specification instruction by a user operation and to specify one area in the image, and a setting unit configured to set an object corresponding to the area specified by the specification unit to be focused on, wherein, in a case where the first area is detected by the first detection unit, the specification unit receives specification of the eye in an area based on the first area regardless of a detection result of the second areas.

Further features of the present invention will become apparent from the following description of exemplary embodiments with reference to the attached drawings.

DESCRIPTION OF THE EMBODIMENTS

Various exemplary embodiments of the present invention will be described with reference to the attached drawings. In each of the exemplary embodiments, an imaging apparatus having an eye detection function is exemplified. As the imaging apparatus having the eye detection function, a video camera, a digital camera, a silver halide still camera, and a mobile device such as a smartphone having a camera function are included as an aspect of the present invention.

Figure 1:
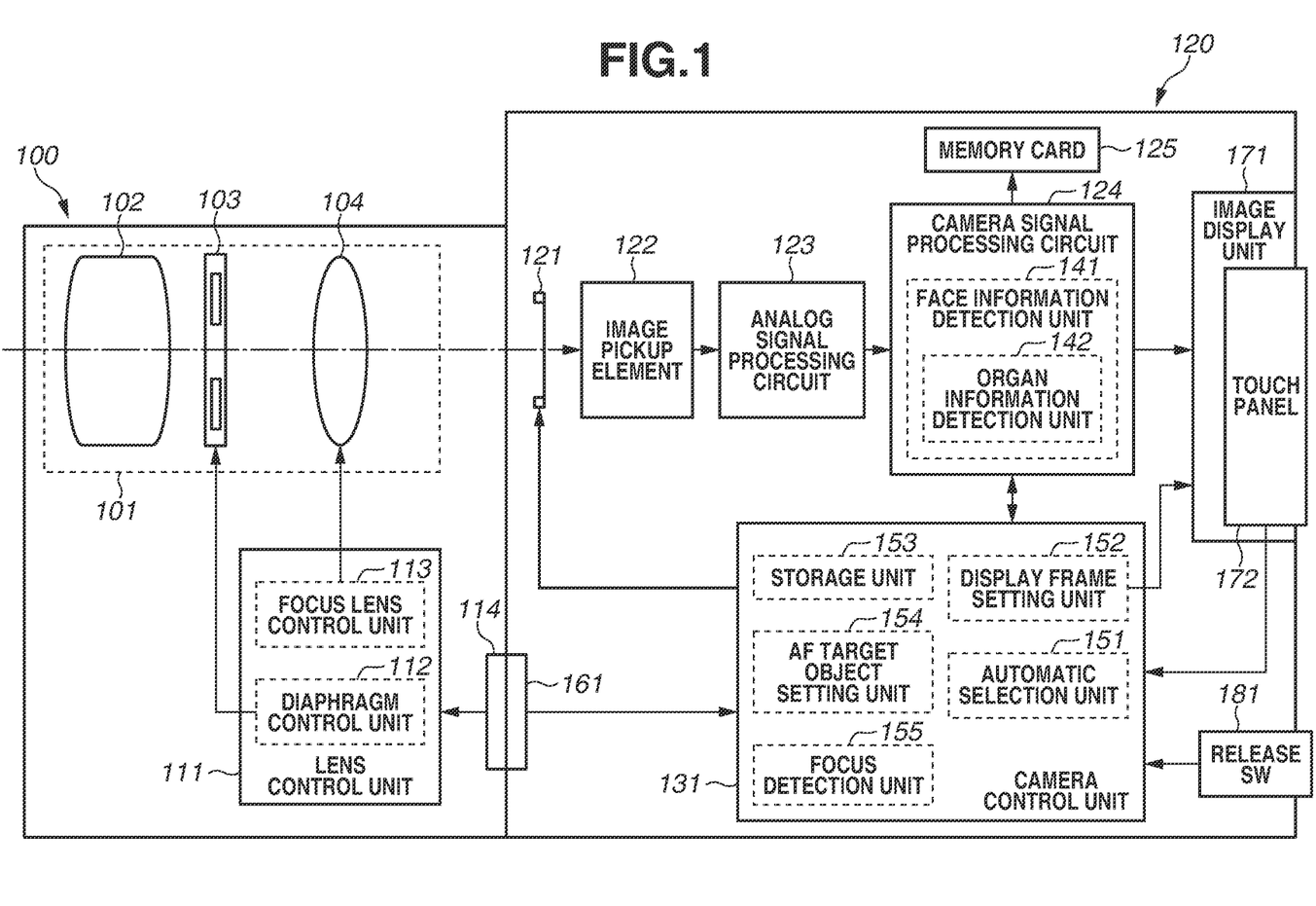
FIG. 1 is a block diagram illustrating a configuration for implementing the present invention.

FIG. 1 illustrates an example of a configuration of an imaging apparatus according to a first exemplary embodiment of the present invention, and a configuration of a mirrorless camera (hereinafter, referred to as a camera) equipped with an eye autofocus (AF) function is exemplified.

An interchangeable lens 100 is one of optical devices which can be mounted on a camera body unit 120. The interchangeable lens 100 is provided with an imaging lens unit 101 which includes a main imaging optical system 102, a diaphragm 103 for adjusting a light amount, and a focus lens group 104 for adjusting focus.

A microcomputer for controlling a lens system (hereinafter, referred to as a lens control unit) 111 includes a diaphragm control unit 112 for controlling operation of the diaphragm 103 and a focus lens control unit 113 for controlling operation of the focus lens group 104. The focus lens control unit 113 drives the focus lens group 104 in an optical axis direction of the imaging lens unit 101 based on focus lens driving information obtained from the camera body unit 120 to adjust focus of the camera.

The focus lens group 104 may include a plurality of focus lenses or only a single focus lens. A fixed focal length lens is illustrated in FIG. 1 as an example of the interchangeable lens 100 for a purpose of simplifying the drawing, but the interchangeable lens 100 may be a lens having a variable focal length (e.g., a zoom lens). In the case of the zoom lens, the focus lens control unit 113 obtains focal length information from an output of an encoder that detects a zoom lens position. In a case of a lens equipped with a camera shake correction function, the focus lens control unit 113 controls a shift lens group for shake correction.

The camera body unit 120 includes a shutter 121 used for exposure control and an image pickup element 122 such as a complementary metal oxide semiconductor (CMOS) sensor. An imaging signal output from the image pickup element 122 is processed by an analog signal processing circuit 123 and then transmitted to a camera signal processing circuit 124.

A microcomputer for controlling a camera system (hereinafter, referred to as a camera control unit) 131 entirely controls the imaging apparatus. For example, the camera control unit 131 controls driving of a shutter driving motor, which is not illustrated, and drives the shutter 121. A memory card 125 is a storage medium for storing data of a captured image. A state of a press on a release switch 181 operated by a user is transmitted to the camera control unit 131, and an image captured in response to the state of the press is stored in the memory card 125.

An image display unit 171 includes a display device such as a liquid crystal display (LCD) which monitors an image the user intends to capture with the camera and displays the captured image. A touch panel 172 is an operation unit on which the user can specify coordinates on the image display unit 171 with a touch of a finger or a touch pen. The touch panel 172 can be configured integrally with the image display unit 171. For example, the touch panel 172 may be of a built-in type (in-cell type) and may be incorporated into an inside of a display surface of the image display unit 171 while being configured not to obscure a display on the image display unit 171 by its light transmittance. Further, input coordinates on the touch panel 172 are associated with display coordinates on the image display unit 171. Accordingly, a graphical user interface (GUI) that allows a user to feel as if the user can directly operate a screen displayed on the image display unit 171 can be configured. An operation state of the touch panel 172 is managed by the camera control unit 131.

The camera body unit 120 includes a mount contact unit 161, which is a communication terminal for communicating with the interchangeable lens 100, on a mount surface with the interchangeable lens 100. Further, the interchangeable lens 100 includes a mount contact unit 114, which is a communication terminal for communicating with the camera body unit 120, on a mount surface with the camera body unit 120.

The lens control unit 111 and the camera control unit 131 control communication to perform serial communication at a predetermined timing via the mount contact units 114 and 161. Through the communication, the camera control unit 131 transmits the focus lens driving information, diaphragm driving information, and the like to the lens control unit 111, and the lens control unit 111 transmits optical information such as a focal length to the camera control unit 131.

The camera signal processing circuit 124 includes a face information detection unit 141, which includes an organ information detection unit 142. The organ information detection unit 142 detects information about an organ such as an eye and a mouth from face information detected by the face information detection unit 141. Detection results of the face information detection unit 141 and the organ information detection unit 142 are transmitted to the camera control unit 131.

The camera control unit 131 includes, as blocks related to the present invention, an automatic selection unit 151 which automatically selects an eye to be a target from the detected face information, and a display frame setting unit 152 which sets a detection frame to be displayed on the image display unit 171 corresponding to the detected face information or the detected eye information. The camera control unit 131 further includes a storage unit 153 which stores information about an eye and a face selected in response to an operation by a user, and an AF target object setting unit 154 which notifies a focus detection unit 155 of the selected or specified eye and face as an object (also referred to as a target object) to be focused on. The above-described units operate based on outputs from the face information detection unit 141 and the organ information detection unit 142. The focus detection unit 155 performs focus detection processing based on an image signal corresponding to the object to be focused on notified by the AF target object setting unit 154. The focus detection processing is executed, for example, by a known phase difference detection method or a contrast detection method. In the case of the phase difference detection method, there is performed processing of calculating an image displacement amount, which is calculated by performing a correlation calculation on a pair of image signals having parallax, or processing of calculating a defocus amount by further converting the image displacement amount into the defocus amount, as the focus detection processing. The defocus amount can be further converted into a focus lens driving amount by taking account of sensitivity to driving the lens of the interchangeable lens 100. The camera control unit 131 transmits a focus detection result (e.g. the image displacement amount or the defocus amount) detected by the focus detection unit 155 or the focus lens driving amount calculated based on the focus detection result to the lens control unit 111. The focus lens control unit 113 controls driving of the focus lens based on the focus lens driving information received from the camera control unit 131. In other words, the camera control unit 131 controls driving of the focus lens via the focus lens control unit 113.

<Eye Selection Processing>

Figure 2:
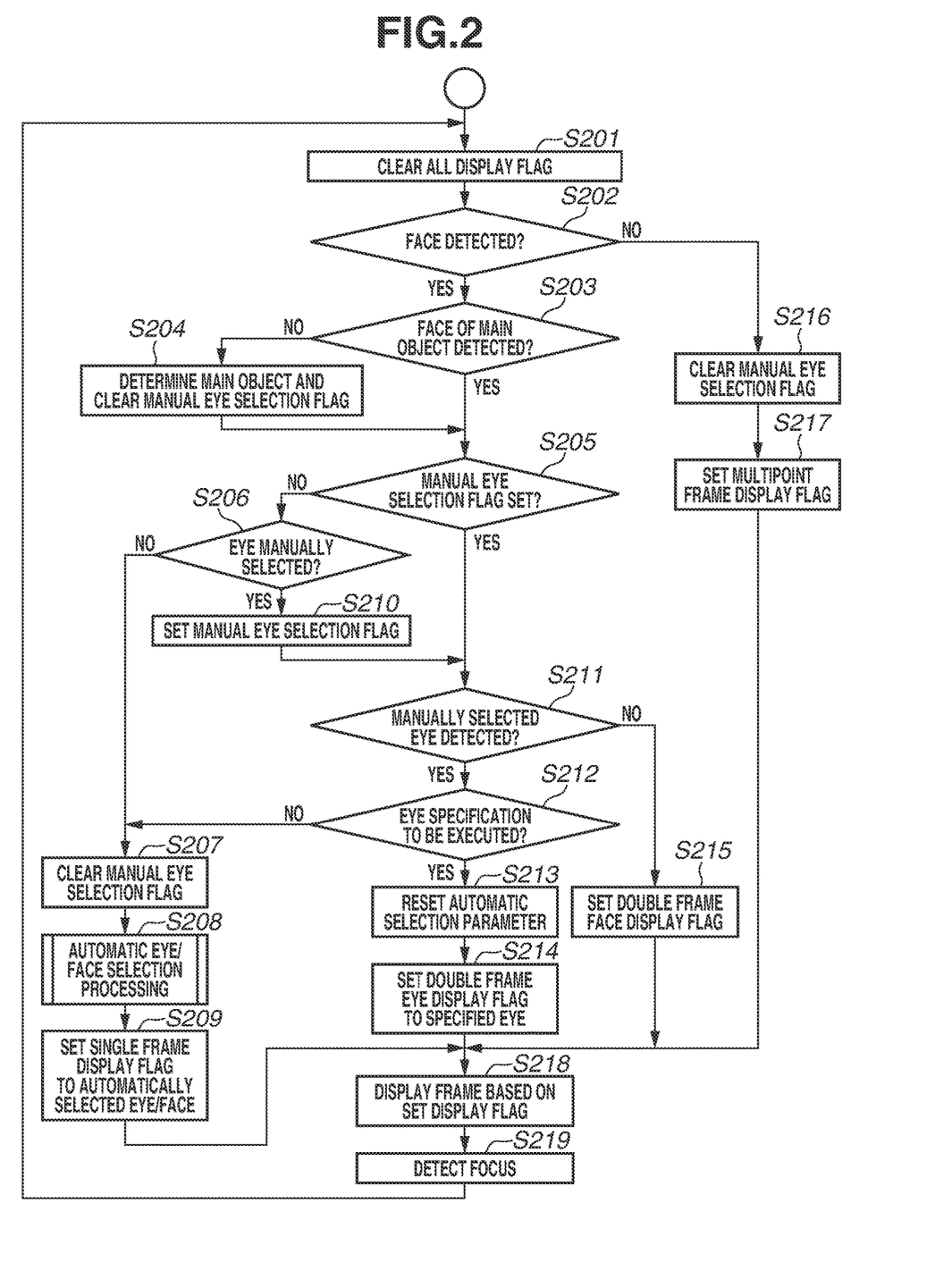
FIG. 2 is a flowchart illustrating operations according to a first exemplary embodiment of the present invention.

FIG. 2 is a flowchart illustrating operation by the camera control unit 131 according to the first exemplary embodiment of the present invention. The processing in FIG. 2 is described as being performed every time an image for each frame is generated, but can be appropriately changed to be performed every predetermined number of frames.

The operation according to the first exemplary embodiment of the present invention is described in detail below with reference to FIGS. 1 and 2.

First, the face information detection unit 141 performs processing of detecting an area corresponding to a face from a captured image signal. Subsequently, the organ information detection unit 142 performs processing of detecting an area that is included in the area corresponding to the face detected by the face information detection unit 141 and corresponds to an eye from the image signal.

In step S201, the camera control unit 131 clears all display flags of a face frame, an eye frame, and a multipoint frame that are set based on a detection result in a past frame, and the processing proceeds to step S202.

In step S202, the camera control unit 131 determines whether a face is detected in a captured image by the face information detection unit 141. In a case where the face is detected (YES in step S202), the processing proceeds to step S203. In a case where the face is not detected (NO in step S202), the processing proceeds to step S216.

In step S203, the camera control unit 131 determines whether a face of a main object is detected among faces detected in step S202. In a case where the face of the main object is detected (YES in step S203), the processing proceeds to step S205. In a case where the face of the main object is not detected (NO in step S203), the processing proceeds to step S204. In a case where the main object is not determined, the processing proceeds to step S204. The main object is a target on which a frame is displayed in step S218 described below and represents an object to be a target of focus detection by the focus detection unit 155 in step S219 described below.

In step S204, the camera control unit 131 determines the face of the main object among the faces currently detected, and the storage unit 153 stores which object is the main object. Further, the camera control unit 131 clears a manual eye selection flag and then advances the processing to step S205. In a case where the processing in step S204 is performed, in steps S205 to S215, S218, and S219 described below, the processing is performed on the face of the main object determined in step S204 and the eye corresponding to the face of the main object. A determination criterion of the main object is, for example, "a face having the largest face area in the captured image signal".

In step S205, the camera control unit 131 determines whether the manual eye selection flag is set. In a case where the manual eye selection flag is set (YES in step S205), the processing proceeds to step S211. In a case where the manual eye selection flag is not set (NO in step S205), the processing proceeds to step S206.

In step S206, the camera control unit 131 determines whether either the left eye or the right eye is manually selected by a user by an operation on the above-described touch panel 172. In a case where either the left eye or the right eye is manually selected (YES in step S206), the processing proceeds to step S210. In a case where either the left eye or the right eye is not manually selected (NO in step S206), the processing proceeds to step S207. In a case where a touch operation for selecting the eye is performed by a user as described above, it is determined that the eye is manually selected.

In a case where an eye of an object different from the current main object is manually selected by a user touching a face area of the object different from the current main object on the touch panel 172, the newly selected object is set as the main object in executing the processing in the subsequent flow. Determination of which eye is selected by an operation on the touch panel 172 is described in detail below with reference to FIG. 5.

In step S207, the camera control unit 131 clears the manual eye selection flag. In a case where the manual eye selection flag is not set, the manual eye selection flag may be cleared or may not be cleared. Subsequently, the camera control unit 131 advances the processing to step S208.

In step S208, automatic selection processing of the eye or the face is executed, and the processing proceeds to step S209. The automatic selection processing is described in detail below with reference to FIG. 3.

In a case where the eye or the face is automatically selected in step S208, in step S209, the camera control unit 131 sets a single frame eye display flag or a single frame face display flag to the eye or the face that has been automatically selected, and the processing proceeds to step S218.

In step S210, the camera control unit 131 sets the manual eye selection flag, and the storage unit 153 stores which one of the left and right eyes of which object is selected by the user.

In step S211, the camera control unit 131 determines whether the eye of the object selected by the user is detected. Specifically, the organ information detection unit 142 determines whether there is an eye matching the eye selected by the user and stored in the storage unit 153.

In a case where the eye of the object is detected (YES in step S211), the processing proceeds to step S212. In a case where the eye of the object is not detected (NO in step S211), the processing proceeds to step S215.

In step S212, the camera control unit 131 determines whether to execute eye specification based on a predetermined eye specification execution condition. In a case where it is determined that the eye specification is to be executed (YES in step S212), the processing proceeds to step S213. In a case where it is determined that the eye specification is not to be executed (NO in step S212), the processing proceeds to step S207.

The eye specification execution condition is that, for example, "it is within a predetermined time from execution of manual eye selection in step S206". If it is within the predetermined time (YES in step S212), the processing proceeds to step S213. If the predetermined time has already passed (NO in step S212), the processing proceeds to step S207. Other examples of the eye specification execution condition include "a user performs an operation for canceling eye selection" and "a size, a position, an angle, reliability, color, brightness, a blur amount, and a shake amount in the face of the specified object are within respective predetermined conditions". If the above-described eye specification execution condition is satisfied (YES in step S212), the processing proceeds to step S213. If the above-described eye specification execution condition is not satisfied (NO in step S212), the processing proceeds to step S207.

The last example is described more specifically. A size of a face of a specified object (hereinafter, referred to as a specified face) is a predetermined value of more, a distance between the specified face and the center of the image is within a predetermined value, an angle of each of pitch, roll, and yaw directions of the specified face is a value within a predetermined range, detection reliability of the specified face is a predetermined value or more, brightness of the specified face is a value within a predetermined range, a blur amount of the specified face is a predetermined value or less, a shake amount of the specified face is a predetermined value or less, and so on.

Figure 3:
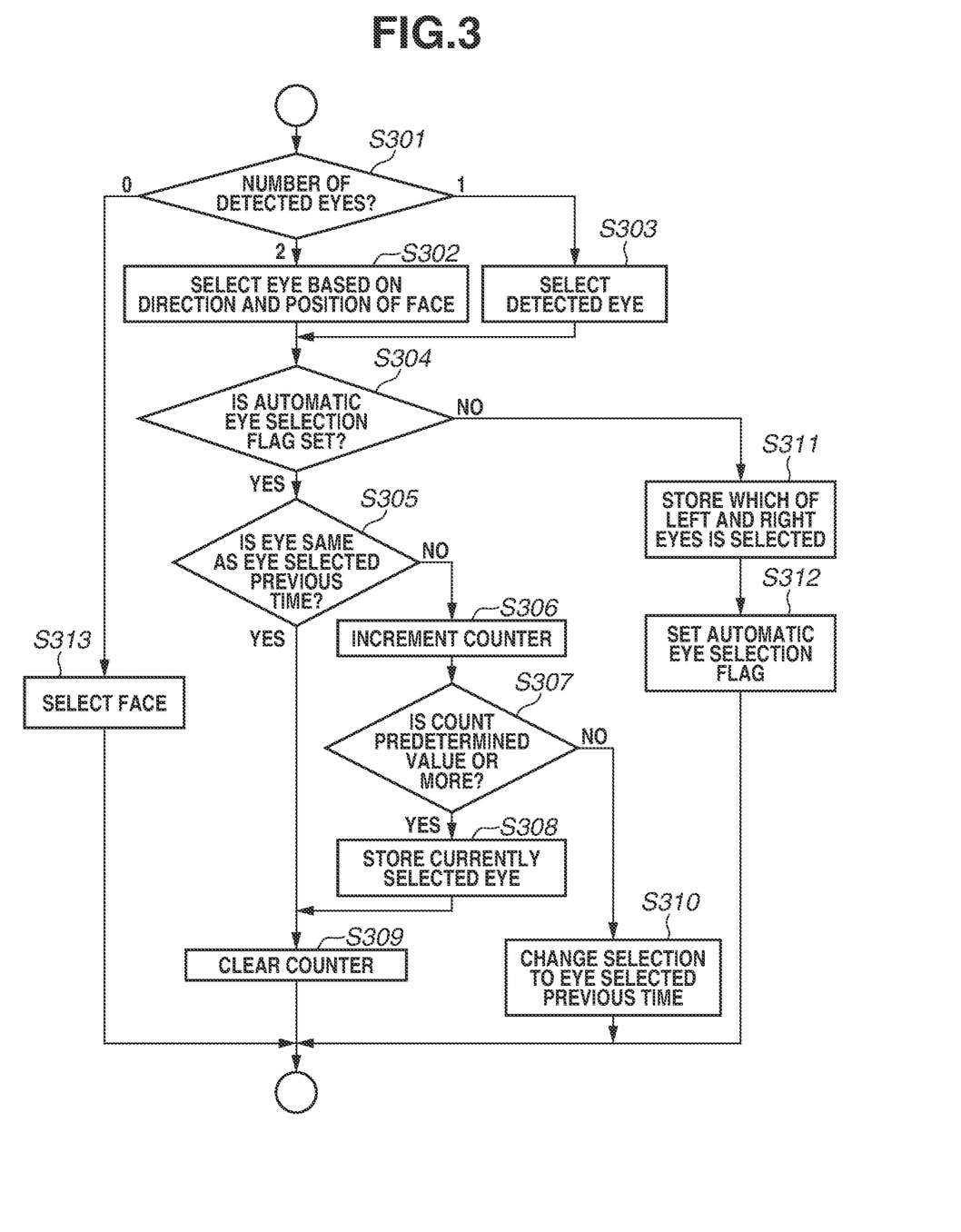
FIG. 3 is a flowchart illustrating a method for automatically selecting an eye.

In step S213, the camera control unit 131 resets a parameter related to automatic selection. The parameter related to automatic selection according to the present exemplary embodiment includes a counter for changing the automatically selected left or right eye to the other of eyes referred to in steps S306, S307, and S309 described below, and an automatic eye selection flag which is referred to in steps S304 and S312 described below, and these parameters will be reset targets. After resetting the parameter, the camera control unit 131 advances the processing to step S214.

In step S214, the camera control unit 131 sets a double frame eye display flag for indicating that the eye is specified and advances the processing to step S218.

In step S211, in a case where the manually selected eye cannot be detected (NO in step S211), in step S215, the camera control unit 131 sets a double frame face display flag and advances the processing to step S218.

In step S202, in a case where the face is not detected (NO in step S202), in step S216, the camera control unit 131 clears the manual eye selection flag and the parameter related to the automatic selection. Further, the storage unit 153 clears main object information. In step S217, the camera control unit 131 sets a flag for performing multipoint frame display indicating a state in which neither the face nor the eye is detected. Then, the processing proceeds to step S218.

In step S218, the display frame setting unit 152 sets any one of the face frame, the eye frame, and the multipoint frame depending on a condition of the set frame display flag, and the image display unit 171 executes display based on the setting. Then, the processing proceeds to step S219.

In step S219, the focus detection unit 155 performs focus detection. Further, the lens control unit 111 controls driving of the focus lens (hereinafter, referred to as focusing) based on a result of the focus detection. In a case where it is determined that the face is not detected in step S202, the focus detection is performed based on, for example, an image signal corresponding to each of the multipoint frames. At this time, the frame is selected using a known method so that, for example, a frame with the closest focus detection result is selected among the multipoint frames, and the driving of the focus lens is controlled based on the focus detection result corresponding to the selected frame. Further, in a case where the area corresponding to the eye automatically or manually selected is not detected, focus detection is performed using an image signal of an area corresponding to the face of the main object. In a case other than the above-described cases, the focus detection is performed using an image signal of the area corresponding to the eye automatically or manually selected.

The first exemplary embodiment is described above. The first exemplary embodiment of the present invention is characterized in that, even in a case where the user selects an eye of a specific object and the selected eye of the specific object is not detected, the selected eye can be focused if the selected eye is detected later.

<Automatic Eye Selection Processing>

FIG. 3 is a flowchart illustrating the automatic selection processing of the eye or the face executed by the camera control unit 131 in step S208.

In step S301, the camera control unit 131 determines the number of eyes detected by the organ information detection unit 142. In a case where both eyes are detected ("2" in step S301), the processing proceeds to step S302. In a case where one of the eyes is detected ("1" in step S301), the processing proceeds to step S303. Further, in a case where neither of the eyes is detected ("0" in step S301), the processing proceeds to step S313. In step S313, the automatic selection unit 151 selects a face.

In the case where both eyes are detected, in step S302, the automatic selection unit 151 selects either the left eye or the right eye depending on a direction and a position of the face detected by the face information detection unit 141. Then, the processing proceeds to step S304. For example, in a case where the face faces the front, the eye closer to the center of an angle of view is selected, and in a case where the face faces left or right, the eye closer to the camera is selected.

In the case where only one of the eyes is detected in step S301, in step S303, the automatic selection unit 151 selects the detected eye. Then, the processing proceeds to step S304.

Next, in step S304, the camera control unit 131 determines whether the automatic eye selection flag is set. In a case where the automatic eye selection flag is set (YES in step S304), the processing proceeds to step S305. In a case where the automatic eye selection flag is not set (NO in step S304), the processing proceeds to step S311.

In step S311, the camera control unit 131 causes the storage unit 153 to store which of the left and right eyes is currently selected. Then, in step S312, the camera control unit 131 sets the automatic eye selection flag.

On the other hand, in a case where the automatic eye selection flag is already set, in step S305, the camera control unit 131 determines whether the eye selected in step S302 or S303 is the same as an eye which is stored in the storage unit 153 and selected up to a previous time. In a case where the selected eye is the same one (YES in step S305), the processing proceeds to step S309. In a case where the selected eye is not the same one (NO in step S305), in step S306 and subsequent steps, the camera control unit 131 performs processing for determining whether to change the eye to the currently selected eye.

In step S306, the camera control unit 131 increments the counter and advances the processing to step S307.

In step S307, the camera control unit 131 determines whether a count of the counter is a predetermined value or more. In a case where the count is the predetermined value or more (YES in step S307), in step S308, the storage unit 153 newly stores the currently selected eye. In step S309, the camera control unit 131 clears the counter and prepares for next eye changing processing.

On the other hand, in a case where the count is not the predetermined value or more (NO in step S307), in step S310, the camera control unit 131 changes selection to the eye which is stored in the storage unit 153 and selected up to the previous time. The above-described processing using the counter is performed to prevent an unnatural display due to continuous switching of the selected eye.

In a case where the eye selected in step S305 is the same as the eye selected the previous time (YES in step S305), in step S309, the camera control unit 131 clears the counter.

As described above, in the automatic selection processing of the eye, a setting is made so that focusing becomes easier by, for example, selecting the eye closer to the center of the angle of view in a case where the face faces the front and selecting the eye closer to the camera in a case where the face faces left or right, not the front. Further, an operation of automatically switching the eye to be selected is performed in a case where a situation changes so that the eye not selected becomes easier to be focused.

Display Example of Display Frame

FIGS. 4A to 4E illustrate display examples of the display frames described in the flowchart in FIG. 2, i.e., examples of the face frame and the eye frame displayed by the image display unit 171.

Figure 4A:
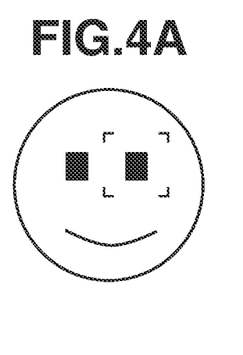
FIGS. 4A to 4E illustrate an example of transition of display of a face frame and an eye frame according to the first exemplary embodiment.

FIG. 4A illustrates a display at the time of automatic selection. The display is displayed in a case where the processing proceeds from step S209 to step S218.

Figure 4B:
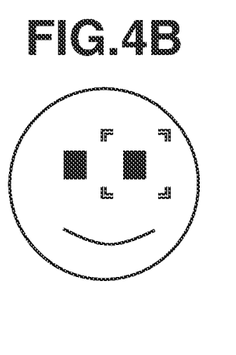

FIG. 4B illustrates a frame display at the time of eye specification, and a double eye frame is displayed. The display is displayed in a case where the processing proceeds from step S214 to step S218.

Figure 4C:
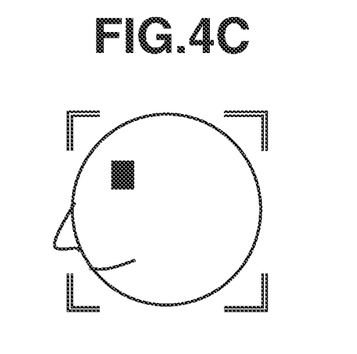

FIG. 4C illustrates a display displayed in a case where the processing proceeds from step S215 to step S218. The display frame is displayed in a case where the manual eye selection is performed, but the selected eye is not detected.

Figure 4D:
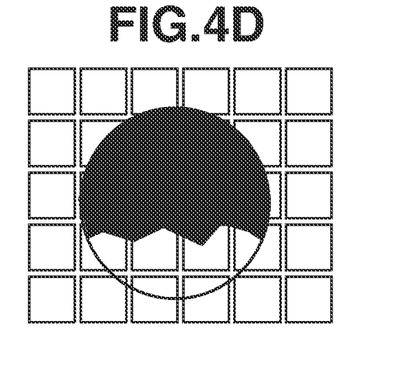
Figure 4E:
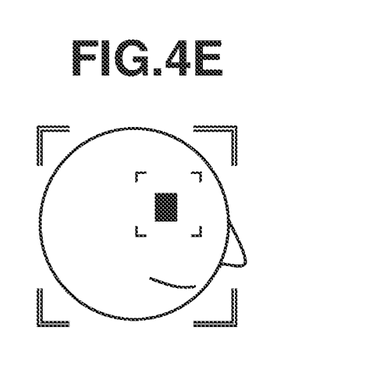

FIG. 4D illustrates the multipoint frames display in a case where the processing proceeds from step S217 to step S218, i.e., in a case where a face is not detected at all.

In the present exemplary embodiment, the configuration is described in which only the face frame is displayed in a case where an eye other than the specified eye is detected. However, the present exemplary embodiment is not limited to the above-described configuration. In the case where an eye other than the specified eye is detected, a frame may be also displayed on the eye other than the specified eye as long as it can be understood that a user currently specifies the eye in such a manner that, for example, the eye frame and the face frame are respectively the single frame and the double frame (e.g., display in FIG. 4E).

The present exemplary embodiment has been described focusing on which one of the left and right eyes is selected as an object to be focused on. Although it is not illustrated, focus detection processing by the focus detection unit 155 is performed based on an imaging signal corresponding to the selected eye. Then, the camera control unit 131 transmits the focus lens driving information (driving information about the focus lens or similar information) calculated based on the focus detection result obtained by the focus detection unit 155 to the lens control unit 111. Accordingly, the imaging apparatus can focus on an appropriate eye.

<Determination Method of Selected Eye>

Figure 5:
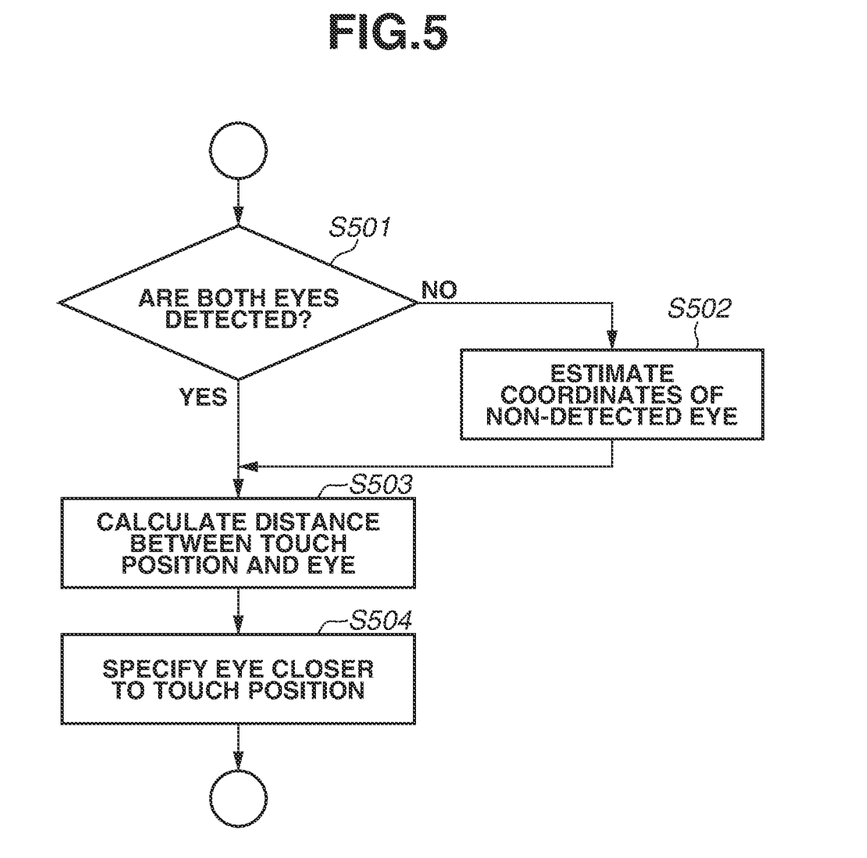
FIG. 5 is a flowchart illustrating processing for determining whether a specified eye is a left eye or a right eye according to the first exemplary embodiment.

FIG. 5 is a flowchart illustrating processing of determining which one of the left and right eyes is specified performed by the camera control unit 131 in step S206.

In step S501, the camera control unit 131 determines whether both eyes are detected by the organ information detection unit 142. In a case where both eyes are detected (YES in step S501), the processing proceeds to step S503. In a case where one of the eye is detected or neither of the eyes is detected (NO in step S501), the processing proceeds to step S502.

In step S502, the organ information detection unit 142 estimates coordinates and a size of a non-detected eye based on pitch, roll, and yaw angles of the face detected by the face information detection unit 141. Then, the processing proceeds to step S503.

In step S503, the camera control unit 131 calculates a distance between each eye and a position at which the user has touched the touch panel 172 (hereinafter, referred to as a touch position). In step S504, the camera control unit 131 specifies an eye at a shorter distance to the touch position.

In a case where a plurality of faces is detected by the face information detection unit 141, the processing in steps S501 to S504 in the flowchart is executed with respect to a face of which the center of a face area is the closest to the touch position.

<Flowchart in Specifying Area Other than Face>

Figure 6:
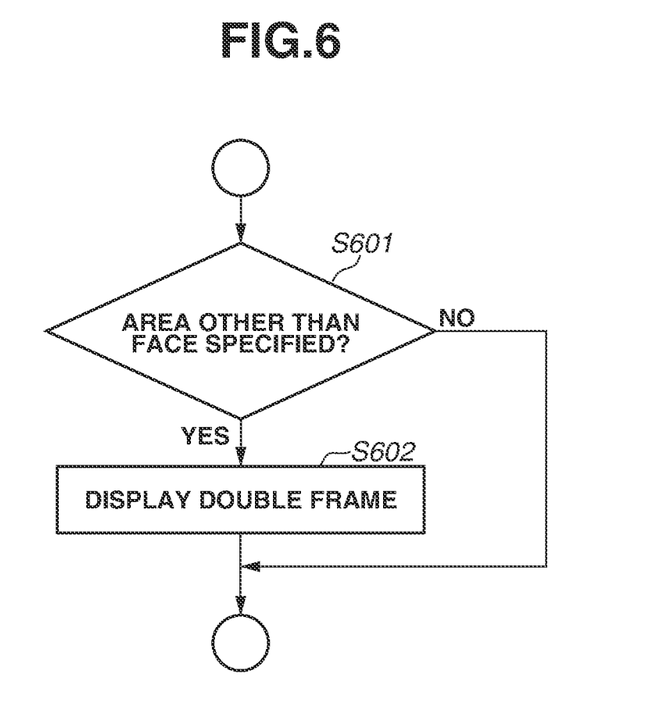
FIG. 6 is a flowchart illustrating processing in a case where an area other than a face is specified according to the first exemplary embodiment.

FIG. 6 is a flowchart illustrating processing executed by the camera control unit 131 in a case where an area other than a face is specified.

In step S601, the camera control unit 131 determines whether an area other than a face is specified by the user. In a case where a face area is specified (NO in step S601), the processing in this flowchart is ended, and the processing in the flowchart in FIG. 2 is performed again. In the case where the area other than the face is specified (YES in step S601), in step S602, the display frame setting unit 152 displays a double frame on the specified area. In the present exemplary embodiment, an area other than a face is regarded as the specified area, but an area other than a head or an area other than an entire body including a face may be regarded as the specified area.

As described above, in a case where either the left eye or the right eye is specified and the specified eye cannot be detected, the eye can be set to be in a specified state if the specified eye is detected later as long as the face is detected. In addition, the specified state is continuously set while the face corresponding to the eye is continuously detected. Accordingly, it is possible to continue to focus on the eye set by the user as an eye intended for imaging. In a case where the face is no longer detected, a predetermined time has elapsed after specification of the eye, or an object changes to a predetermined state, it is regarded that a scene is now different from a scene originally intended by the user. Thus, selection of the eye by the user is released, and an automatically selected eye is focused on. Accordingly, it is possible to flexibly deal with a change in the scene and continue to focus on the eye. Further, since the specified eye can always be selected, it is possible to always focus on the eye intended by the user.

In the present exemplary embodiment, the example is described in which the specification state of the eye is maintained while the face corresponding to the eye is continuously detected and selection of the eye by the user is released if the face is no longer detected. However, a human body or a head may be used instead of a face. As with the case of the face, the human body or the head which corresponds to an eye is used, so that an intended eye can be continuously focused on while the user can capture an intended object.

While the present invention has been described in detail based on the exemplary embodiments, the present invention is not to be limited to the specific exemplary embodiments and may include various other embodiments within a scope not deviating from the gist of the present invention. A part of the above-described exemplary embodiment may be combined with another exemplary embodiment as appropriate.

Further, the present invention includes a case in which a software program for implementing functions of the above-described exemplary embodiments is supplied to a system or an apparatus which includes a computer capable of executing the program directly or via wired/wireless communication from a recording medium and is executed. Therefore, a program code which is supplied to and installed in the computer for implementing functional processing of the present invention by the computer realizes the present invention. In other words, a computer program for implementing the functional processing of the present invention is included in the present invention. In this case, the program may be in any form, such as an object code, a program to be executed by an interpreter, and script data to be supplied to an operating system (OS), as long as the program functions as a program. A recording medium for supplying the program may be, for example, a hard disk, a magnetic recording medium such as a magnetic tape, an optical/magnetooptical storage medium, and a nonvolatile semiconductor memory. Further, as a method for supplying the program, there is considered a method in which a computer program for implementing the present invention is stored in a server on a computer network, and a client computer which connects to the server downloads and executes the computer program.

With the present invention, an eye which is more in line with a user's intention can be focused on, in comparison with the conventional technique.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

What is claimed is:

1. An image processing apparatus comprising:
   one or more processors; and
   a memory storing instructions which, while being executed by the one or more processors, cause the image processing apparatus to function as units comprising:
   a first detection unit configured to detect, for each of images captured based on image signals output from an image pickup element, one or more first areas each corresponding to an eye;
   specification unit configured to receive an area specification instruction by a user operation and to specify an area in an image; and
   a setting unit configured to set an object corresponding to the area specified by the specification unit as an object to be focused on,
   wherein, in a case where no first area is detected by the first detection unit when the specification unit receives the area specification instruction in a first image and the one or more first areas are detected thereafter in a second image, the setting unit sets the object corresponding to the specified area as the object to be focused on, based on the area specification instruction and the detected one or more first areas.

2. The image processing apparatus according to claim 1, wherein the units further comprise a second detection unit configured to detect, for each of images captured based on image signals output from the image pickup element, a second area.

3. The image processing apparatus according to claim 2, wherein the specification unit receives the area specification instruction in the second area of the first image.

4. The image processing apparatus according to claim 2, wherein the second area is an area corresponding to a face.

5. The image processing apparatus according to claim 4, wherein the units further comprise an estimation unit configured to estimate the first area corresponding to a yet-to-be detected eye based on an angle of the face.

6. The image processing apparatus according to claim 2, wherein the specification unit specifies the second area in a case where one of the one or more first areas is specified but the specified one of the first areas is not detected.

7. The image processing apparatus according to claim 2, wherein the units further comprise a determination unit configured to determine whether one area, among the one or more first areas, is to be specified based on a state of at least one of the first or the second areas, and
   wherein, in a case where the determination unit determines that the one area, among the one or more first areas, is to be specified based on the state of at least one of the first or the second areas, the specification unit specifies one area among the one or more first areas.

8. The image processing apparatus according to claim 7, wherein the state is at least one of a size, a position, an angle, reliability, color, brightness, a blur amount, or a shake amount of the area.

9. The image processing apparatus according to claim 2, wherein the units further comprise a release unit configured to release specification of the specified area.

10. The image processing apparatus according to claim 9, wherein, in a case where the specified area is not detected after a predetermined time has elapsed from the specification, the release unit releases the specification of the area specified by the specification unit.

11. The image processing apparatus according to claim 10, wherein, in a case where the second area is no longer detected by the first detection unit, the release unit releases the specification of the area specified by the specification unit.

12. The image processing apparatus according to claim 2, wherein the second area includes a plurality of faces, and each of the one or more first areas corresponds to an eye in each of the plurality of faces.

13. The image processing apparatus according to claim 1, wherein the units further comprise a display unit configured to display the image signal output from the image pickup element and to include a touch panel, and
   wherein the specification unit specifies one of the one or more first areas based on a position at which a user touches the display unit.

14. The image processing apparatus according to claim 13, wherein the specification unit specifies the first area corresponding to an eye at a shorter distance to the position at which the user touches the display unit.

15. A method for controlling an image processing apparatus, the method comprising:
   detecting, for each of images captured based on image signals output from an image pickup element, one or more first areas each corresponding to an eye;
   receiving an area specification instruction by a user operation and specifying an area in an image; and
   controlling driving of a focus lens based on an image signal corresponding to the specified area,
   wherein, in a case where no first area is detected when the area specification instruction is received in a first image and the one or more first areas are detected thereafter in a second image, the object corresponding to the specified area is set as the object to be focused on, based on the area specification instruction and the detected one or more first areas.

16. A non-transitory computer-readable storage medium configured to store a computer program for a subject tracking device to execute the following steps:
   detecting, for each of images captured based on image signals output from an image pickup element, one or more first areas each corresponding to an eye;
   receiving an area specification instruction by a user operation and specifying an area in an image; and
   controlling driving of a focus lens based on an image signal corresponding to the specified area,
   wherein, in a case where no first area is detected when the area specification instruction is received in a first image and the one or more first areas are detected thereafter in a second image, setting the object corresponding to the specified area as the object to be focused on, based on the area specification instruction and the detected one or more first areas.

17. An image processing apparatus comprising:
one or more processors; and
a memory storing instructions which, while being executed by the one or more processors, cause the image processing apparatus to function as units comprising:
a first detection unit configured to detect, for each of images captured based on image signals output from an image pickup element, one or more first areas each corresponding to an eye;
specification unit configured to receive a position specification instruction by a user operation and to specify a position in an image; and
a setting unit configured to set an object corresponding to the position specified by the specification unit as an object to be focused on,
wherein, in a case where no first area is detected by the first detection unit when the specification unit receives the position specification instruction in a first image and the one or more first areas are detected thereafter in a second image, the setting unit sets the object corresponding to the specified position as the object to be focused on.

18. The image processing apparatus according to claim 17, wherein the units further comprise a second detection unit configured to detect, for each of images captured based on image signals output from the image pickup element, a second area.

19. The image processing apparatus according to claim 18, wherein the second area is an area corresponding to a face.

20. The image processing apparatus according to claim 19, wherein the units further comprise an estimation unit configured to estimate the first area corresponding to a yet-to-be detected eye based on an angle of the face.

21. The image processing apparatus according to claim 18, wherein the second area includes a plurality of faces, and each of the one or more first areas corresponds to an eye in each of the plurality of faces.

22. The image processing apparatus according to claim 17, wherein the units further comprise a display unit configured to display the image signal output from the image pickup element and to include a touch panel, wherein the specification unit specifies a position in an image based on a position at which a user touches the display unit.

23. The image processing apparatus according to claim 22, wherein the setting unit sets an eye at a shorter distance to the position at which the user touches the display unit as the object to be focused on.

24. The image processing apparatus according to claim 17, wherein the units further comprise a release unit configured to release specification.

25. A method for controlling an image processing apparatus, the method comprising:
detecting, for each of images captured based on image signals output from an image pickup element, one or more first areas each corresponding to an eye;
receiving a position specification instruction by a user operation and specifying a position in an image; and
controlling driving of a focus lens based on an image signal corresponding to the specified position,
wherein, in a case where no first area is detected when the position specification instruction is received in a first image and the one or more first areas are detected thereafter in a second image, the object corresponding to the specified position is set as the object to be focused on.

26. A non-transitory computer-readable storage medium configured to store a computer program for a subject tracking device to execute the following steps:
detecting, for each of images captured based on image signals output from an image pickup element, one or more first areas each corresponding to an eye;
receiving a position specification instruction by a user operation and specifying a position in an image; and
controlling driving of a focus lens based on an image signal corresponding to the specified position,
wherein, in a case where no first area is detected when the position specification instruction is received in a first image and the one or more first areas are detected thereafter in a second image, the object corresponding to the specified position is set as the object to be focused on.

* * * * *